Nov. 28, 1961 R. KALNINS 3,010,226
EDUCATIONAL GAME
Filed Jan. 22, 1958 3 Sheets-Sheet 1
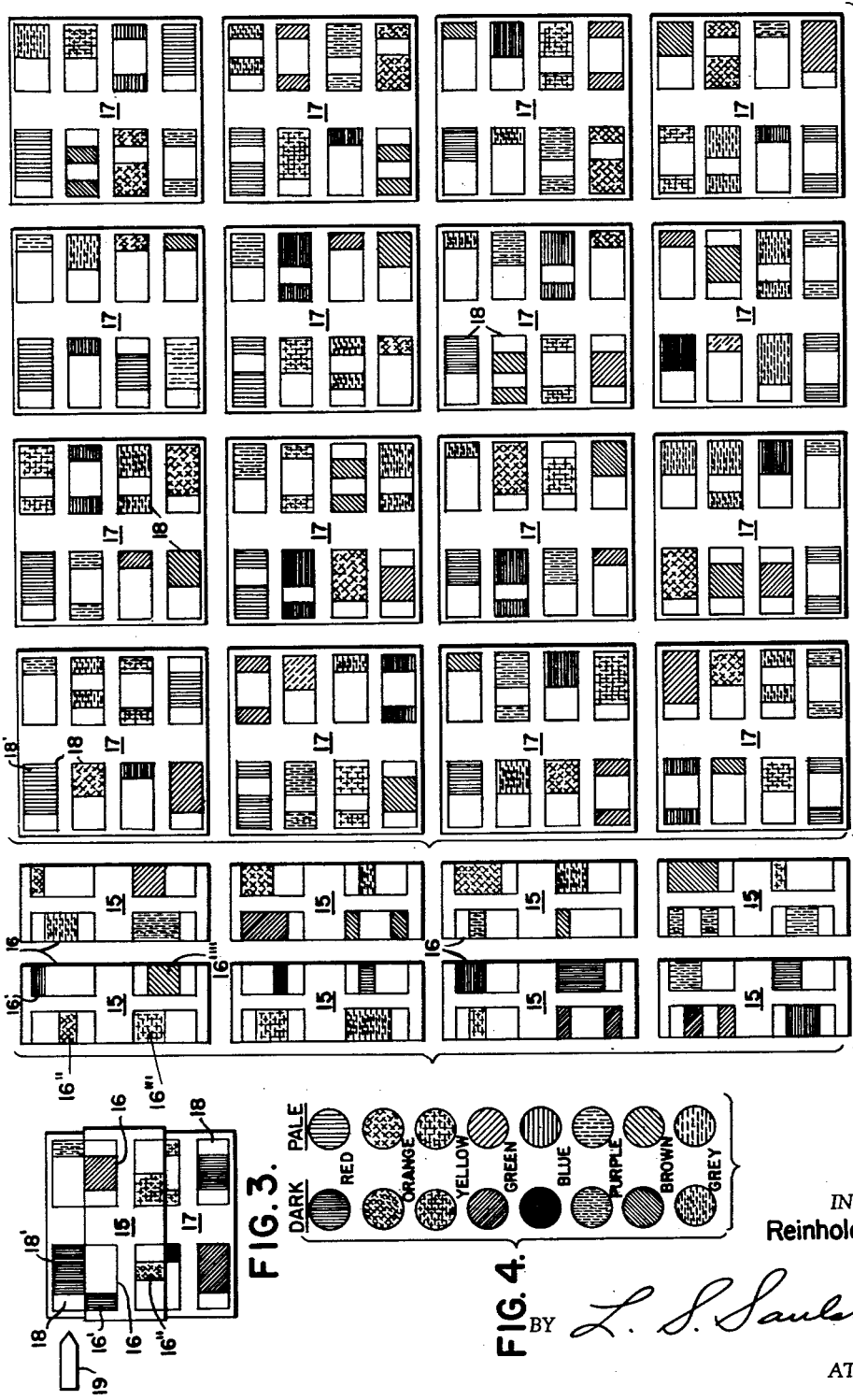
INVENTOR
Reinhold Kalnins
BY L. S. Saulsbury
ATTORNEY Nov. 28, 1961 R. KALNINS 3,010,226
EDUCATIONAL GAME
Filed Jan. 22, 1958 3 Sheets-Sheet 2
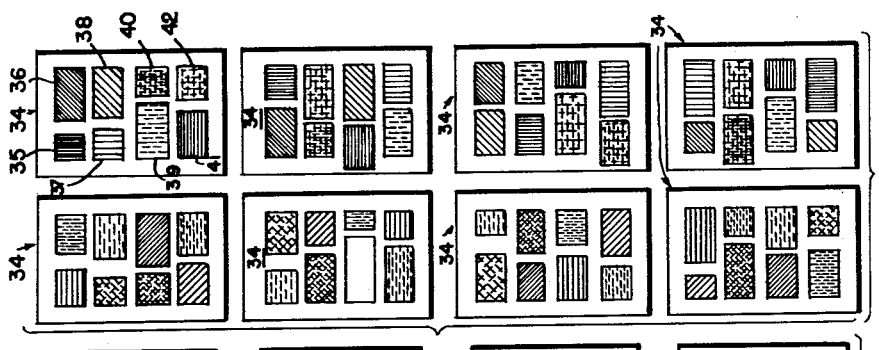
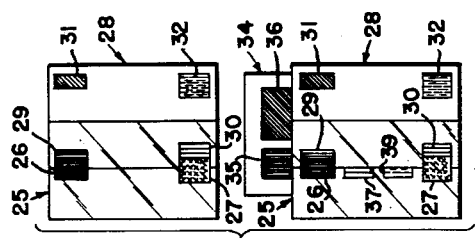
INVENTOR
Reinhold Kalnins
BY *L. S. Saulsbury*
ATTORNEY Nov. 28, 1961   R. KALNINS   3,010,226
EDUCATIONAL GAME
Filed Jan. 22, 1958   3 Sheets-Sheet 3

INVENTOR
Reinhold Kalnins

ATTORNEY

United States Patent Office 3,010,226
Patented Nov. 28, 1961

3,010,226
EDUCATIONAL GAME
Reinhold Kalnins, 2 King St., New York 12, N.Y.
Filed Jan. 22, 1958, Ser. No. 710,462
5 Claims. (Cl. 35—69)

This invention relates to an educational game.

It is the principal object of the invention to provide an educational game in which the player will acquire a perception of color tone, difference in sizes, a capability of matching shapes, and the combined fitting of color, size and shape of one playing element with the color, complementary size and shape of another playing element.

It is another object of the invention to provide an educational game employing various color sizes and shapes adapted for matching with colors and complementary sizes and shapes whereby the player must through mental observation determine the additive effect of the shapes by comparison of not only the color, size and shape but to determine from other displays of larger sizes and shapes the resultant color, size and shape and thereby provide for advanced memory training.

It is still another object of the invention to provide an educational game in which memory is a requisite part of the game, and by the playing of which the memory of the players will be improved.

It is a further object of the invention to provide an educational game which not only requires the study of colors, sizes and shapes, but also requires the concentration by memory as to the comparative location of the colors, sizes and shapes upon the playing element, relative to one another and relative to a boundary area.

It is a still further object of the invention to provide an educational game to improve the viewing sense of the players for color, shape and location and without the use of symbols.

Figures 10, 11:
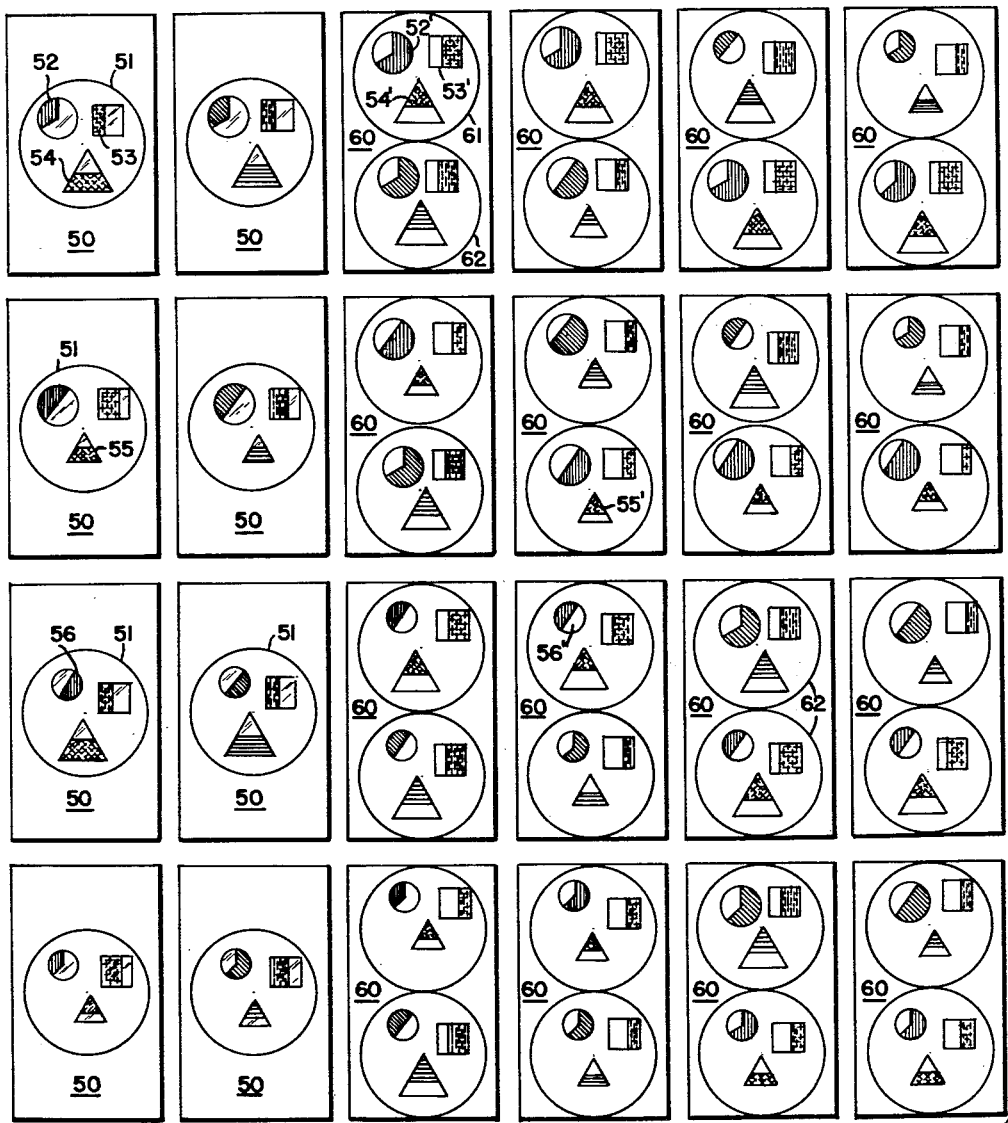
Figure 12:
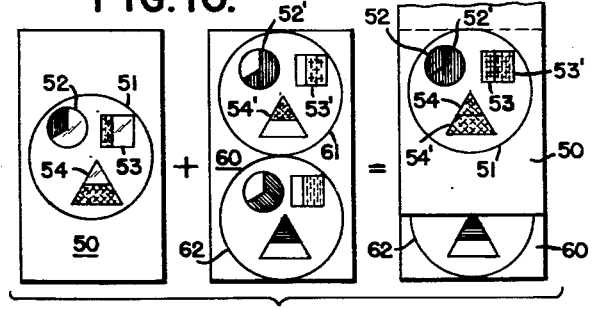

For other objects, and for a better understanding of the invention, reference may be had to the following detail description taken in connection with the accompanying drawing, in which FIGURE 1 is a collective plan view of eight small cards, each of which bears rectangular shapes with areas of different color, size and location thereon, FIG. 2 is a collective view of sixteen cards bearing similar areas, colors and complementary areas for the areas of the first cards, FIG. 3 is a plan view of one card of the card group shown in FIG. 1 superimposed upon one complementary card of the group shown in FIG. 2 to determine the correctness of the player's selection and whether or not he will have scored a point for matching color, complementary size and location of the rectangular areas on the cards, FIG. 4 is a collective view of symbols for the sixteen different colors that are used on the cards in the different forms of the game, FIG. 5 is a collective plan view of eight transparent cards having two areas, the areas of each card being of different color and size and according to another form of the invention, FIG. 6 is a collective view of sixteen cards providing the second set for use in playing this form of the invention, each of the cards of this set having four areas on each card, the areas being of different color, shape and size and with which similar colors of the first set can be compared as to color and of which the size along with the size of the first set must be noted and added, FIG. 7 is a collective plan view of eight cards constituting a third set of cards and on each of which there are eight areas of sizes adapted to be equal to the sum of the compared areas of a card of each of the first and second sets and with the same color of those cards, FIG. 8 is a collective plan view of three cards, one card from each of the three sets on which there are areas of the same color and in which the size on the third card is equal to the combined sizes on the first two cards added together with similar color, with illustration being made as to the manner in which the cards are superimposed and compared, FIG. 9 is a collection of eight different size areas used in all three sets of cards of this form of the invention, FIG. 10 is a collective plan view of a set of partially transparent cards illustrating another form of the invention and displaying different shapes that are located differently with relation to the boundary and different color complements, FIG. 11 is a collective plan view of a set of sixteen cards bearing complementary colored areas, shapes, sizes and locations for the colored areas, shapes, sizes and locations of the cards of the first set, and FIG. 12 is a collective view of two cards, one from each set, which have been compared and superimposed with one another for color, size, shape and exact location within the boundary area.

Referring now particularly to FIGS. 1 to 3, a set of light small cards 15 is shown collectively in FIG. 1, each of which has four color frames or rectangular areas 16. In FIG. 4, there are shown the different color designations which are used. Reading down in the left hand column these colors are red, orange, yellow, green, blue, purple, brown, gray, and down in the right column, pale red or pink, pale orange, pale yellow, pale green, pale blue, pale purple, pale brown and pale gray. Both the dark and pale colors have the usual color designations but with the pale colors the lines of designation are spaced farther apart. While these colors have been selected for use with this game it shall be understood that any other color or degree of paleness thereof can be used. Each of the frames on the card 15 is divisible into four parts, and any one or more of the parts are similarly colored. The number of parts of course can be altered, be of less or greater number as desired. For example, the upper frame on the top card 15 in the left column has a quarter part 16′ at the left end thereof colored red. The frame to the left has a third quarter part 16″ colored orange. The next frame 16 has the first two quarter parts thereof colored yellow as indicated at 16‴ and the last frame on this particular card has the two intermediate quarters adjoining one another colored green as indicated at 16⁗. By comparing the frames of each of the other cards of the first set with the set of symbols shown in FIG. 4 one can determine quickly the colors that are used. While sixteen symbol designation have been given only the first eight or dark colors are being used with this particular form of the invention.

It will be seen in viewing the other cards of the first set shown in FIG. 1 that the colors of the set of eight are used and that three quarters of the parts and spaced quarter parts of a frame are colored.

A second set of cards 17 shown in FIG. 2 having similar color and complementary quarter frame parts as the frame parts shown in FIG. 1, will be provided with four frames throughout the set. There are sixteen cards 17 in this set and each card has eight frames 18, arranged in two vertical rows of four each. Both the first and second sets of cards of this form of the invention are non-transparent and the color areas are only upon one side.

It will be understood that this form of the game is played with two sets of cards. With the first set of cards, which are the small cards, one card is handed to each player. The player will observe the color, in each of the frames of this card, its size, and the quarter locations in the frame. The player after making a cursory observation then turns the card face down in front of him. A card is then taken from the second set and laid face up in front of the players. Each of the players will examine this card to see if he can find one or more similar colors and their complementary size and location that he has remembered from the frames 16 of card 15 in the frames 18 of the card 17.

If the player finds what he thinks to be a complementary frame part for a card 17 and the same color, he will place a chip 19 near the card 17 adjacent to the complementary frame 18 of card 17. The players will have the same number of chips 19 to start with and there will be chips in the bank.

For example, and as shown in FIG. 3, the player who possesses the first card 15 will upon finding a complementary frame on card 17 bearing the same color 18' as the frame 16' on the card 15 will place the chip 19 adjacent to the frame 18 of the card 17. He may or may not have the proper color and proper complementary location. The other players will do the same thing and their chips 19 may be placed on any complementary frames with same color that they might find. If two or more complementary frames and colors are found by any one player, he will place more than the one chip adjacent the card. All players will do the same.

Once the chips have been so placed, the players' small cards are turned up for close examination and comparison with the card 17 from the second set. If the player has been right, he will retrieve his chip and take one from a bank. If he has been wrong his chip will be given up to the bank. If the players find that they have missed placing chips on any of the frames of the card 17 the players must forfeit a chip to the bank for each mistake. In FIG. 3, it will be seen that the color part 16' of frame 16 of card 15 plus the frame 18 of card 17 will add to one full imaginary frame. The small card 15 is constructed by having the frame areas lying at the edges of the card so that the card can be placed favorably upon the card 17 and so as to determine more quickly and with more certainty the correctness of the player's selection. For the next round, the players will keep the small cards 15 but again turn them face down, having now become more familiar with the frames thereon, and there will again be placed in front of the players another card 17 from the second set. Each player will then again place the chips 19 adjacent the selected frames 18 on the card 17 for the color and complementary frame parts which he believes will compare with this card. By this time he will have become more familiar with the frames on his card and possibly with the frames of another player's card so that upon the small cards again being turned up he may not only receive and forfeit chips from his card but may also win or lose chips from noting failure of the other players, by calling them in advance before the card is turned up for examination, for not locating chips on the frames of the new card 17 when they should have. If the one player is right the other player must hand him two chips plus the one the one player placed, and if he is wrong, he must forfeit his chip to the other player. When eight cards of the second set have been played out the small cards of the first set can be exchanged between players if there have been more than four players in the game or if there had been four or less players new cards can be taken.

When all of the second set of cards have been played out, the players will count their chips and the player that has the most chips will be the winner. All players will have started with the same number of chips.

Referring now particularly to FIGS. 5, 6, 7, 8 and 9, there is shown another form of the invention in which the entire sixteen colors of FIG. 4 are used, of which there are eight dark colors and eight pale colors corresponding respectively to the dark colors. This form of the invention has frames of different colors and of the eight different rectangular sizes that are outlined in FIG. 9 and indicated respectively with Roman numerals. There are three sets of cards which sets have all of the colors with the frame sizes on the first and second sets of cards smaller than the frame sizes on the third set whereby the total area of the frame sizes in the first and second sets when added up is provided by a frame size on the third set of cards.

The first set of cards 25 is transparent except for the color areas as shown in FIGS. 5 and 8. Each card 25 of this first set has two color areas 26 and 27 of different color and size. The size of the areas will run from II to IV, or be of three different sizes. In each instance they are of the same height but are of different widths. The size will have to be determined wholly from examination and the player will have to remember in addition to the color which one of the three sizes appears. One card of this first set is handed to each player and he will observe momentarily the colors and sizes on the card and will thereupon place the card face down in front of him the same as in the first set of the previously described form of the invention.

The second set has sixteen cards 28 as shown in FIG. 6 each of which has four different color areas 29, 30, 31 and 32 thereon. Each of the sixteen colors of the first set of cards will be repeated four times on the second set of cards, and each of these colors will appear in four different sizes from the first size I through the fourth size IV. One card of this second set is laid down face up for comparison by memory of the players of their cards therewith. Each player will state whether or not the card may have his color as found on his first set card and if some of the players do not have at least one of these colors a second card 28 will be placed face up and if there are still players who fail to find their colors a third card will be placed face up beside the other two. By this time each player should have found a color but it is possible one may not have found such a color but nevertheless only the three cards will be permitted to be so examined.

These second set cards, one two or three, which even number may have been necessary, will after the players have observed the size as well as their color, be turned face down.

All of the third set of cards 34 as shown in FIG. 7 are now laid down face up beside one another. Each of these cards of this third set has eight areas of a size or width adapted to be the summation or total area of the two combined same color areas 26 and 29 found on the respective cards 25 and 28 of the first and second sets. The sizes of the areas on the third set of cards run from III to VIII. There are eight areas 35, 36, 37, 38, 39, 40, 41, 42, on each of the cards 34. Each of the sixteen colors is repeated four times in this set of cards but the sizes of the repeated color areas are all different for each color. The sizes as stated above run from III to VIII and one color may have four different sizes. Altogether the third set of cards shown in FIG. 7 has sixty-four color areas and no one is exactly the same in color and size. With this number of colors and different sizes the combined size combination of any two same colors on the first and second set of cards may be found in the third set. The players will now before the first and second cards are turned up mark with the chips 19 on the areas of the third set of cards the summations of their sizes and color. Thereafter, the players will turn face up their first and second set cards to determine whether or not their selections with the chips upon the third set of cards 34 have been right or wrong. If a player is right he will retrieve his chip and will take one further chip from the bank. If he has been wrong, he will forfeit the chips to the bank.

In FIG. 8 there is shown one player's card 25 which has a second size red color area 26. A second set card 28 has a first size red color 29 which can be matched with the color area 26 of the first card 25 to provide a total three size color area. The third set card 34 has a third size red area 35 which is the summation of the two red areas of the first and second set cards 25 and 28. If the player and holder of the card 25 has placed a chip on the summation red area 35 of the third set card 34 he will be permitted to retrieve his chip and to take one further chip from the bank. If he has placed the chip on some other area on the third set card 34 he will be wrong and will have to forfeit his chip to the bank. The first card 25 is transparent and is laid over the second card 28 so that the red areas 26 and 29 add up and can be compared together with the sum area 35 of the third card 34 in the manner illustrated in FIG. 8. The first round of play has now been finished, and the third set of cards will be covered.

The second round may now begin, the same way as the first round, the players will retain their cards of the first set and will again turn them face down. The card or cards from the second set will have been picked up and new second cards will be placed face up, from one to three cards. The players will observe again the new second set of cards and they will then again be turned face down. The third set of cards will now be uncovered, and the players will again locate the chips of their summation on the color areas of the third set of cards. The first and second set of cards are turned up and again the chips will either be retrieved and one taken from the bank or they will be forfeited to the bank. If the players may have called each other on their plays they may forfeit or receive chips depending on whether or not the other player was right or wrong in the same manner as above described in reference to the first form of the invention. The game will continue with other rounds until all of the cards of the second set have been used for comparison. The chips of the players are then counted and the holder of the most chips will be considered the winner of the game.

Referring now particularly to FIGS. 10, 11 and 12, there is shown a still further form of the invention, in which not only colors are used but also geometrical figures bearing part areas of colors, and the location or position of these figures relative to one another and relative to a boundary area on the card. In FIG. 10, the first set of cards is shown. These cards are identified by the numeral 50 and have respectively a single circular boundary line 51 within which are disposed the different shaped geometrical figures or frames, as for instance a large circle 52, a square 53, a large triangle 54, a small triangle 55, or a small circle 56. Three of these figures or frames are positioned within the circle boundary 51 and of different nearness to the circle boundary and to one another. These frames or areas are only in part colored and for which the complements of the size for a given color in a given shape frame must be found on a second card in a manner later to be described. The large circle 52 may be colored for less than one half of its area or for the full one half thereof. The squares 53 are one third and two thirds colored, and the triangle 54 has its lower part colored. The small circle 56 is colored similarly to the large circle 52. The small triangle 55 has either its lower or upper parts colored. The uncolored parts of the figures are transparent.

On this set of cards 50 there are displayed six different colors all of which can be determined in the symbol chart shown in FIG. 4. One of these cards is given to each player who will observe the colors, the frame shapes, the position and proportion of the color within the frame areas, the location of the frame areas relative to the circular boundary 51 and the relative location of the frame areas to one another. When the player has done this, the card will be placed face down in front of him.

The second set of cards as shown in FIG. 11 will be dealt out and placed face up in front of all the players, one at a time, until all of the players may have placed at least one chip adjacent an area of these cards and never more than three cards at one play would be so placed from the second set for one round of play.

The colors of this second set of cards 60 number six the same as with the first set of cards. Each card 60 of this set has two areas 61 and 62 in each of which are disposed a complementary large circular frame area 52' or a small circular frame area 56', a large triangular frame area 54' or a small triangular frame area 55', and a square frame area 53', the arrangement of the areas within each area 61 and 62 corresponding to the arrangement within one of the boundaries 51.

With up to three cards of the second set having been observed by the players and the players having placed their chips 19 in places where they feel they see the complements of the portions of same size and shape areas for the same colors and lying within the boundary circle in the same locations relative thereto and to each other, the first set card will be turned up for visual comparison. The boundary circle with same areas and colors of a card of the first set will appear exactly four times on the second set of cards. If the player has been right in his selection of the second card, he will retrieve his chip and receive another chip from the bank. If he has been wrong, he will forfeit his chip to the bank.

After the players have finished placing the chips on the second set of cards, and while the players first set of cards are still face down, one player can call another player with a chip so that he may receive chips from the other player, if the other player was wrong in placing his chip or failed to place a chip, but if the calling player was wrong he will forfeit the call chip to the other player.

For example, in FIG. 12, a player may have received the first card 50 of the first set in which there is a large circle 52, a square 53, and a large triangle 54 that respectively have red, orange and yellow parts. A complement of these parts for the given shape and size and with the same colors will be found on the first card 60 of the second set within the boundary 61 and as indicated respectively at 52', 53' and 54'. By superimposing the first set card 50 with its transparent uncolored parts upon the second set card 60, the figures will appear in full same color if the correct selection has been made. Each player will have thus compared his first set card with the figures in the boundary circles of the second set cards and with the same having been properly done as illustrated in FIG. 12, the player may retrieve his chip 19 and take one chip from the bank. Had he been wrong, he would have lost the chip to the bank.

For the second round, the second set cards will have been removed, and the player again observes his first set card and thereafter turns it face down. Now other cards, one up to three, are taken from the second set and placed face up in front of the players. The players will again place chips on these new second set cards whre they feel they have a comparison. One player may call another player as above described and finally the players will be awarded chips from the bank or give up chips to the bank and forfeit call chips where they have been wrong, all of this having been done when the players first set cards have been again turned up for observation by all of the players. The game may continue round by round until all sixteen cards of the second set have been used in this manner. The game is then completed and the player having the most chips will be the winner.

It should now be apparent that there has been provided by the several forms of this invention a game which will improve the color sense, and concentration of color and size proportions visually, as distinguished from symbolic training, and the memory of the players.

It shall be further understood that the game can be made up of cards of any size or of any number or the various unnamed or nameless color areas can be located on a single board with adequate covers for the different sets, and also the colors and shapes can be varied as desired to add further interest in the game.

It shall still further be understood that while certain colors and shades of colors have been used that other colors and numerous different shades thereof can be used, that different shapes, sizes of shapes and the proportion of the colors within the shapes, the locating of the shapes relative to a first boundary may be varied and altered, as desired, without departing from the spirit and scope of the invention as defined by the appended claims.

What is claimed is:

1. An educational visual training game comprising a plurality of sets of cards, each of the cards of one set having an area of color and shape, a second set of cards having areas of similar colors and shapes complementary to the shape of the area of the card of the first set of cards for the given color with which the card of the first set may be matched whereby the player must not only match color but complementary shape in order to make a score, the area of the cards of the first set being of rectangular shape and divisible into first, second, third and fourth quarters therealong and the color for the rectangular shapes filling one or more of the quarter portions but no more than three, the remaining uncolored quarters of the first card areas being supplied in effect by colored areas of the second card areas.

2. An educational visual training game as defined in claim 1, and the color areas of the cards of the first set being located along the side edges of the cards in order that these areas may be vertically aligned with the complementary areas of the second set.

3. An educational visual training game comprising three sets of cards having color areas of the same height but of different widths, and the shapes of the areas of the cards of the first and second sets of cards for given colors being of different width and being additive to one another to provide a visual effective width, and the third set of cards being of widths greater than the widths on the first and second set of cards and adapted to equal the summation of the widths of the mated areas of the cards of the first and second sets.

4. An educational visual training game comprising a plurality of sets of cards, the cards of one set providing areas of different color, size, shape and proportion and the cards of the other sets having more areas of the same color, but the size, shape and proportions for each given color being the complement of the first card areas whereby a selected area on one card of the first set may be visually compared with any similar area in any one of the cards of the second set.

5. An educational visual training game as defined in claim 4, and said cards of said sets having a boundary line surrounding the different shapes, and said shapes being disposed within the boundary line with different nearness thereto and with different nearness to one another.

References Cited in the file of this patent

UNITED STATES PATENTS

| | | |
|---|---|---|
| 869,302 | Healy | Oct. 29, 1907 |
| 1,410,922 | Johnson | Mar. 28, 1922 |
| 1,428,456 | Stranders | Sept. 5, 1922 |
| 1,568,206 | Brandt | Jan. 5, 1926 |
| 1,571,488 | Moisan et al. | Feb. 2, 1926 |
| 1,755,853 | Waring | Apr. 22, 1930 |
| 2,296,623 | Albosta | Sept. 22, 1942 |
| 2,611,616 | Kloss | Sept. 23, 1952 |
| 2,634,132 | Freedman | Apr. 7, 1953 |
| 2,659,163 | Albee | Nov. 17, 1953 |